(12) United States Patent
Ehrlich et al.

(10) Patent No.: US 7,863,973 B2
(45) Date of Patent: Jan. 4, 2011

(54) OPERATING PANEL ARRANGEMENT FOR DOMESTIC APPLIANCES AND METHOD FOR MANUFACTURING AN OPERATING PANEL ARRANGEMENT

(75) Inventors: Ralf Ehrlich, Berlin (DE); Michael Seikel, Berlin (DE); Roland Meyer, Bernau/OT Boernicke (DE); Marek Betnerowicz, Berlin (DE); Peter Geiger, Eningen (DE); Ronald Hegewald, Laaber (DE)

(73) Assignee: PAS Deutschland GmbH, Neuruppin (DE)

( * ) Notice: Subject to any disclaimer, the term of this patent is extended or adjusted under 35 U.S.C. 154(b) by 271 days.

(21) Appl. No.: 12/210,984

(22) Filed: Sep. 15, 2008

(65) Prior Publication Data

US 2009/0072883 A1 Mar. 19, 2009

Related U.S. Application Data

(63) Continuation of application No. PCT/EP2007/001745, filed on Mar. 1, 2007.

(30) Foreign Application Priority Data

Mar. 16, 2006 (DE) .................... 10 2006 013 937

(51) Int. Cl.
*H03K 17/687* (2006.01)
(52) U.S. Cl. .................. 327/603; 700/83; 700/180
(58) Field of Classification Search .......... 327/603
See application file for complete search history.

(56) References Cited

U.S. PATENT DOCUMENTS 4,066,850 A * 1/1978 Heys, Jr. ............... 200/5 A
4,092,527 A * 5/1978 Luecke .................. 708/140
4,347,416 A * 8/1982 Ogden ................... 200/317
4,355,983 A * 10/1982 Asbill, III ............... 434/219
5,694,793 A 12/1997 Nishimura (Continued)

FOREIGN PATENT DOCUMENTS

DE 19512150 A1 10/1996

(Continued)

OTHER PUBLICATIONS

PCT/EP2007/001745, International Search Report, Prettl Appliance Systems GmbH, Jan. 3, 2007.

*Primary Examiner*—Lincoln Donovan
*Assistant Examiner*—William Hernandez
(74) *Attorney, Agent, or Firm*—Turocy & Watson, LLP

(57) ABSTRACT

The invention relates to an operating panel arrangement, in particular for domestic appliances such as washing machines and tumble dryers. An operating panel has formed on its outside actuating sections and display sections for operating or monitoring purposes. An electrical circuit arrangement is coupled to the actuating sections and the display sections and is arranged in the region of the inside of the operating panel.

In this case, the circuit arrangement has at least three electrodes, which are arranged in a manner distributed approximately parallel to the operating panel. The circuit arrangement has evaluation means which are designed to calculate the spatial position of an operating means in relation to the position of the three electrodes, to be precise by evaluating the fields between the electrodes and the operator. The actuating sections can be freely defined as positions of the operating means in the region of the outside of the operating panel.

19 Claims, 7 Drawing Sheets

U.S. PATENT DOCUMENTS

| | | | |
|---|---|---|---|
| 5,793,648 A * | 8/1998 | Nagle et al. | 703/8 |
| 6,111,207 A * | 8/2000 | Arterberry et al. | 200/5 R |
| 7,041,922 B2 * | 5/2006 | Geiger et al. | 200/296 |
| 7,489,303 B1 * | 2/2009 | Pryor | 345/173 |
| 2003/0025733 A1 | 2/2003 | Broker et al. | |
| 2009/0062938 A1* | 3/2009 | Breimesser et al. | 700/83 |

FOREIGN PATENT DOCUMENTS

| | | |
|---|---|---|
| DE | 29902522 U1 | 11/1999 |
| DE | 102004047516 A1 | 4/2006 |
| EP | 0029770 A1 | 6/1981 |
| GB | 2205164 A | 11/1988 |
| GB | 2262820 | 6/1993 |
| WO | 2004109005 | 12/2004 |

* cited by examiner

OPERATING PANEL ARRANGEMENT FOR DOMESTIC APPLIANCES AND METHOD FOR MANUFACTURING AN OPERATING PANEL ARRANGEMENT

CROSS-REFERENCE TO RELATED APPLICATIONS

This is a Continuation application of International patent application PCT/EP 2007/001745, filed Mar. 1, 2007, which claims the priority of German patent application DE 10 2006 013 937, filed Mar. 16, 2006.

BACKGROUND OF THE INVENTION

The present invention relates to an operating panel arrangement, in particular for domestic appliances such as washing machines and tumble dryers, comprising an operating panel which has formed on its outside actuating sections and display sections for operating or monitoring purposes, and comprising an electrical circuit arrangement which is coupled to the actuating sections and the display sections and is arranged in the region of the inside of the operating panel.

The present invention also relates to a method for manufacturing an operating panel arrangement of this kind.

Nowadays, the operating panels (panel bodies) for domestic appliances are generally manufactured from plastic using an injection-molding process. The operating panels have a curved shape, often for esthetic reasons. The actuating sections are nowadays designed either as rotary controllers or as keys. The switching elements are generally mechanically actuated. However, touch-sensitive switching elements are also known.

The display sections are nowadays used by light-emitting diodes (LEDs), possibly with individually formed light guides, or LCD displays (monitors).

When using light-emitting diodes, light guides are often inserted into the panel and welded or adhesively bonded. The operating panel contains openings for this purpose. When displays are used, a matching plastic window is installed in the panel (by welding or adhesive bonding), and the display (for example LCD) is positioned behind this window. The display and actuating sections are usually located on an electronic circuit mount (a printed circuit).

Since water from the outside must not reach the printed circuit through the openings located in the panel, a high level of outlay on production and testing is required.

The operating panels are printed before installation in order to identify actuating sections and display sections. This is often done by pad printing or screen printing.

One of the fundamental problems encountered in the production of domestic appliances is that they have to be manufactured in a large number of different variants. Firstly, a specific type of machine is often manufactured with different equipment variants. The various equipment variants often have different numbers of switches and displays. The overall layout of the switches and display devices on the operating panel is often different, in order to create a clearer distinction. A further aspect is the different languages, since, in order to be sold in different countries, the same type of machine has to be printed with the respective language.

For the different equipment variants, individual operating panels in each case have to be manufactured using an injection-molding process and kept in store.

Similar problems to those encountered in the case of panels for domestic appliance also occur in the case of operating panels for machines of all types, in particular machine tools, operating panels for vehicles, in particular cockpit panels, and operating panels for electrical media equipment such as televisions, stereo systems, MP3 players etc.

BRIEF SUMMARY OF THE INVENTION

The object of the present invention is to specify an improved operating panel arrangement and an improved method for manufacturing an operating panel arrangement of this kind.

The above object is achieved by an operating panel arrangement, in particular for domestic appliances such as washing machines and tumble dryers, comprising an operating panel which has formed on its outside actuating sections and display sections for operating or monitoring purposes, and comprising an electrical circuit arrangement which is coupled to the actuating sections and the display sections and is arranged in the region of the inside of the operating panel, wherein the circuit arrangement has at least three electrodes, which are arranged in a manner distributed approximately parallel to the operating panel, and an evaluation section which is designed to calculate the spatial position of an operator in relation to the position of the three electrodes, to be precise by evaluating the fields between the electrodes and the operator, so that the actuating sections can be freely defined as positions of the operator in the region of the outside of the operating panel.

It is possible to calculate the spatial position of the operating means by using three electrodes by means of the so-called triangulation method. To this end, coordinates are calculated on the basis of trigonometric relationships in a manner which is known per se.

An actuating section is then no longer necessarily a mechanical switch or button. Instead, the position of an actuating section can be completely freely defined. When the operating means assumes a specific spatial position in relation to the operating panel, this is judged as actuation of the actuating section. The spatial position may be a position directly on the outside of the operating panel. However, it may also be a position at a distance from the operating panel.

It is therefore possible to realize completely different arrangements of actuating sections using standard hardware in the form of the circuit arrangement with the three electrodes and the evaluation means. It goes without saying here that this should be identified to operators, for example for different equipment variants, by different types of displays on the operating panel.

In fact, variants of the domestic appliance are formed in relation to the actuating sections solely by different programming of the circuit arrangement.

Overall, this permits significantly more degrees of freedom for the manufacture and individualization of the operating panel arrangement according to the present invention.

The above object is also achieved by a method for manufacturing an operating panel arrangement which is constructed in different variants, comprising the steps of:

a) shaping an operating panel;

b) assembling the operating panel and a circuit arrangement;

c) programming the circuit arrangement as a function of the variant for which the operating panel arrangement is manufactured; and d) printing the operating panel as a function of the variant for which the operating panel arrangement is manufactured, with step c) and/or step d) taking place after step b).

Whereas programming and/or printing took place before assembly of the operating panel and the circuit arrangement in the prior art, this individualization (matched to different equipment variants etc.) now takes place only at the end of the value added chain.

This provides enormous advantages in the course of production and reduces production costs, with the level of individualization being increased at the same time (or individualization being made possible for the first time).

Step d) may follow step c), or vice versa. Steps c) and d) can preferably also take place at the same time, that is to say at a production station at which the operating panel is printed and the circuit arrangement is programmed.

In this case, it is particularly advantageous when the operating panel is printed using a digital printing method, for example using an inkjet printing process.

This permits flexible printing, preferably as a function of the actuating sections which are likewise provided in a flexible manner. In a line production method, printing can be different from machine to machine using a digital printing process. A batch size of 1 is possible.

In other words, it is possible to utilize the production lines more effectively since, building on the same basic machine, all presentation variants can be manufactured in any desired order. As a result, production can primarily be performed in accordance with requirements.

In this case, it is generally also possible to produce individual designer pieces, that is to say to individualize operating panel surfaces.

It is particularly preferable for both programming and printing to be performed using "soft" parameters, specifically using software. In this case, it is preferably not necessary to provide "hard" printing plates or the like for printing purposes.

The at least three electrodes, which are used to determine the position of the operating means, may be, for example, three punctiform electrodes. More than three uniform electrodes may also be provided, in order, for example, to cover larger areas and/or to implement means for redundancy calculation or error correction.

As an alternative, it is also possible to provide the electrodes as grids comprising linear electrodes which are insulated from one another and are preferably arranged such they cross over. When determining the position, an even higher resolution may possibly be achieved with a grid arrangement of this kind.

The punctiform electrodes or grid lines may be provided, for example, as conductor tracks on a printed circuit of the electrical circuit arrangement.

The electrodes/grids are preferably arranged close behind the operating plane. In this case, the grid can be provided either as a film or conductor track sections can also be applied, for example directly (for example by printing with carbon) on the inside of the panel.

The operating panel arrangement according to the invention and the manufacturing method according to the invention for an operating panel arrangement can be used, in particular, for domestic appliances, for example in the form of operating panels for washing machines, tumble dryers, dishwashers etc.

Secondly, the operating panel arrangement according to the invention and the method according to the invention for manufacturing an operating panel arrangement can also be used for other applications, for example operating panel arrangements for machines such as machine tools, control machines, control consoles for machines, production machines, production systems, logistics systems etc. The operating panel arrangement according to the invention and the manufacturing method can also be used in the field of vehicles, in particular in the form of operating panel arrangements for cockpit devices or other operating devices (for example rear-seat entertainment systems).

Furthermore, the operating panel arrangement according to the invention and the associated manufacturing method can also be used for electronic equipment such as media equipment (televisions, stereo systems, surround systems, MP3 players etc.)

In the case of the operating panel arrangement according to the invention, it is particularly preferable when the operator is a finger.

In this embodiment, the spatial position of the finger in relation to the operating panel and the actuating sections programmed there can be directly detected, in order to establish whether an actuating section should be actuated or not.

It is also advantageous when the point electrodes are arranged in the region of corners of an operating field of the operating panel within which the actuating sections are arranged.

This optimizes reliability when identifying the position of the operating means.

However, it is also generally feasible for an operating field to extend beyond the field which is defined by the electrodes.

As an alternative or in addition, it is possible to form the electrodes as a conductive grid comprising conductor track sections, as mentioned above.

According to a further preferred embodiment, at least one actuating section is shown on the outside of the operating panel by being printed on. In this case, printing is preferably performed as part of the method according to the invention.

However, as an alternative or in addition, it is also possible for at least one actuating section to be shown on the outside of the operating panel by a display on a monitor (display).

In the present case, a monitor is to be understood as a display with a relatively large number of columns and rows, that is to say a display with a graphics capability.

In this case, it is possible to define actuating sections on the front of the monitor, so that the monitor can be actuated in the manner of a touch-screen monitor.

At least some of the display sections are preferably likewise realized by a monitor of this kind.

In this case, it is particularly advantageous for both the display sections and the operating sections to be completely freely programmable, that is to say for different equipment variants to be realized with the same hardware.

It is also feasible here for a machine to be reprogrammed after it is put into operation. It is feasible, for example, to freely switch further functions which are not included in the basic equipment of the machine by means of such reprogramming. Therefore, a user can purchase such functions as required (for example for additional washing programs or the like in the case of a washing machine).

It is particularly advantageous here when the monitor is a film-type monitor. Although it is also feasible to use a conventional LCD monitor, a film-type monitor has the advantage that it can be matched directly to the often curved shape of the operating panel. The film-type monitor can be applied (adhesively bonded or laminated) on the outside of the operating panel, for example. It is also possible to in-mold coat the flexible film prepared in this way with a plastic in order to thus form the operating panel.

It is also particularly advantageous when the monitor is an OLED monitor.

OLEDs (Organic Light Emitting Devices) of this kind can be located in a film layer.

OLEDs of this kind provide some technical advantages, for example a large viewing angle and a very rapid response time. In addition, the black values and the contrast are good. Background lighting is generally not required, and this permits production of extremely thin displays (monitors).

According to a further preferred embodiment, at least one display section has an LED which is arranged on a printed circuit in the region of the inside of the operating panel.

A state (for example signaling of switch-on of a specific washing program or the like) can be indicated by means of an LED of this kind in a comparatively simple and cost-effective manner.

Since a printed circuit is generally provided for the electrical circuit arrangement in any case, an LED or a plurality of LEDs can be mounted on said printed circuit.

The printed circuit may be rigid. However, it is particularly preferable when the printed circuit is manufactured from a flexible material and is arranged approximately parallel to the operating panel, at least in the region of a display field in which the display sections are arranged.

In this embodiment, it is possible to form the display sections identically, regardless of the respective position on the printed circuit.

It is also advantageous in this case when the operating panel has an aperture, through which light from the LED shines, in the region of at least one display section.

In this case, the operating panel is generally opaque and a display section can therefore be exactly bounded by means of the aperture. The aperture can be closed by a transparent piece, in order to ensure water-tightness.

However, it is also possible for the operating panel to be entirely transparent and to be provided with an opaque coating/tint which is masked or omitted only in the region of such an aperture.

According to a further alternative embodiment, the operating panel has a wall section, which is of relatively low wall thickness and through which light from the LED shines, in the region of at least one display section.

In the case of this embodiment, the outlay on production can be reduced further overall. Since the operating panel is generally manufactured using an injection-molding process, such wall sections of relatively low wall thickness can be easily realized.

It is also advantageous when a display field has a grid coordinate system with a plurality of fixed positions, of which at least some are fitted with LEDs.

In the case of this embodiment, different variants of the domestic appliance can be realized by LEDs being fitted in different positions on the grid coordinate system as required.

However, the outlay on hardware is reduced overall since the printed circuit can generally be manufactured with a standard layout for different variants.

It is also particularly advantageous when the LEDs are coupled to the operating panel via light guides in each case.

Although it is generally also feasible to focus the LED beams by means of a respective lens, the use of light guides has the advantage that focusing can generally be realized more easily.

The use of flexible light guides is also advantageous since different lighting points can be achieved as a result, even when a standard printed circuit board in which the position of the LEDs is fixed is used.

It is also particularly advantageous when at least one light guide is angled and is connected to an LED in such a way that the LED can illuminate different display sections depending on the rotation position of the light guide.

In the case of this embodiment, different variants can be realized by the angled light guide being mounted in a different rotation position, depending on the equipment variant. As a result, a large number of variants with regard to the arrangement of the display sections can be realized with essentially the same layout of the printed circuit.

It is also advantageous overall when the circuit arrangement has a proximity sensor which identifies the approach of the operating means and activates specific circuit sections as the operating means approaches.

In the case of this embodiment, parts of the electrical circuit arrangement can be moved to a sleep mode, in order to thus reduce power consumption. As the operating means approaches, the proximity sensor identifies this and the sleeping circuit parts can be woken up. This applies, in particular, to display devices such as a monitor or LEDs which consequently consume power only when a display is actually desired by the user.

It is particularly advantageous here when the proximity sensor is realized by means of the arrangement comprising the at least three electrodes and the evaluation means, that is to say when, as an operating means (a finger) approaches the operating field, said proximity sensor identifies that operation will follow.

The touch-field electronics according to the invention can not only implement a proximity function, but preferably specific movement patterns can be detected and evaluated. As a result, it is also possible to detect the intentions of the user.

If, for example, when a domestic appliance is running, a user approaches a switch/a key for opening the door, moving, in particular rotating, parts (such as spray arms or washing drums) can be switched off in a virtually anticipatory manner. As a result, increased safety can be achieved in the not uncommon cases of a user wanting to "add" another item while the domestic appliance is running.

By way of example, switch-off can also be performed in stages, so that the movement energy (rotation speed) is reduced when a movement pattern toward a door switch is identified, so that the throughflow rate of a circulation pump is reduced or the like, it being possible to ultimately switch off the appliance only when a door is actually opened.

In other applications, a movement pattern of this kind can recreate a potentiometer function. If a person or a hand moves upward or downward (or to the left or to the right) in front of the operating panel (without touching it), a potentiometer function can be identified and realized as a result. In other words, a car driver, for example, can reduce the volume by waving his hand past the operating panel in a downward direction, and increase the volume by waving his hand in an upward direction.

According to a further preferred embodiment, a data interface by means of which the electrical circuit arrangement can be initially programmed or reprogrammed is provided.

By means of this measure, corrections can also be made after complete creation of the application, for example for the purposes of quality control, but also at the final customer's premises. A data interface of this kind can also be used for "upgrading" purposes, in order, for example, to implement further washing programs.

It is also advantageous when the electrical circuit arrangement is designed for the purpose of being able to initially define actuating sections, such as keys and key functions, by making an input on the operating field.

As a result, correction and/or upgrading of the machine are/is also possible after creation of the application.

Overall, a technological construction kit comprising a so-called touch-field electronics system (electrodes plus evaluation means), a variable printing system (digital, for example by means of inkjet) and a variable lighting/display system can be realized with the operating panel arrangement according to the invention.

In this case, the touch-field electronics system permits flexible arrangement of actuating sections (that is to say operating elements), flexible key allocation and individualization of functions. It goes without saying that, for the purpose of better handling, is it preferred when an audible and/or visual acknowledgement follows actuation of such "imaginary" actuating sections. The electrode or sensors for the touch field can be formed on a rigid or flexible printed circuit or on an MID plastic part (Molded Integrated Device). It is possible to define the actuating section position at the end of the value added chain. It also goes without saying that a potentiometer function can be realized by actuating sections being correspondingly programmed in an adjoining manner. Online configuration by the final user is also possible. Furthermore, a customer-specific operating surface in accordance with the customer's wishes is generally also possible, partly even after purchase of the appliance. It is also possible to realize identification of the user (child-proofing).

The actuating sections which are arranged so flexibly can be displayed in a correspondingly flexible manner, for example by flexible printing (digital printing). In this case, printing even of areas with a pronounced curvature is possible, specifically preferably in a contact-free manner.

Individual designer pieces can be realized. As mentioned above, online catalog selection and production "on-demand" is possible.

In this case too, the variant is defined only at the end of the value added chain, in other words, panels which are already completely assembled are preferably printed on.

In general, it is also possible to print electrical conductive layers on the operating panel, or, for example, fluorescent colors or the like, in order to generate a corresponding signaling effect.

Variable lighting can also be realized. Firstly, such lights can be printed on in layers and electronically actuated.

It is possible to realize the lighting by means of a flexible monitor on the upper face of the panel (film-type monitor or organic LEDs).

When using LEDs, it is feasible for these LEDs to provide an array or a grid, so that it is possible to fit LEDs "on-demand".

Accordingly, a light guide grid can be provided, for example by means of angled light guides, in order to realize the greatest possible flexibility.

The operating panel can be manufactured from transparent plastic and be printed/coated, the printing/coating being excluded (by a mask or removal of the coat or the like) from the display sections. However, it is also possible to form the operating panels with different (lower) wall thicknesses in the region of display sections.

It goes without saying that the abovementioned features and those still to be explained in the text which follows can be applied not only in the respectively specified combinations but also in other combinations or on their own, without departing from the scope of the present invention.

BRIEF DESCRIPTION OF THE SEVERAL VIEWS OF THE DRAWING

Exemplary embodiments of the invention are explained in greater detail in the following description and illustrated in the drawing, in which.

DETAILED DESCRIPTION OF THE INVENTION

Figure 1:
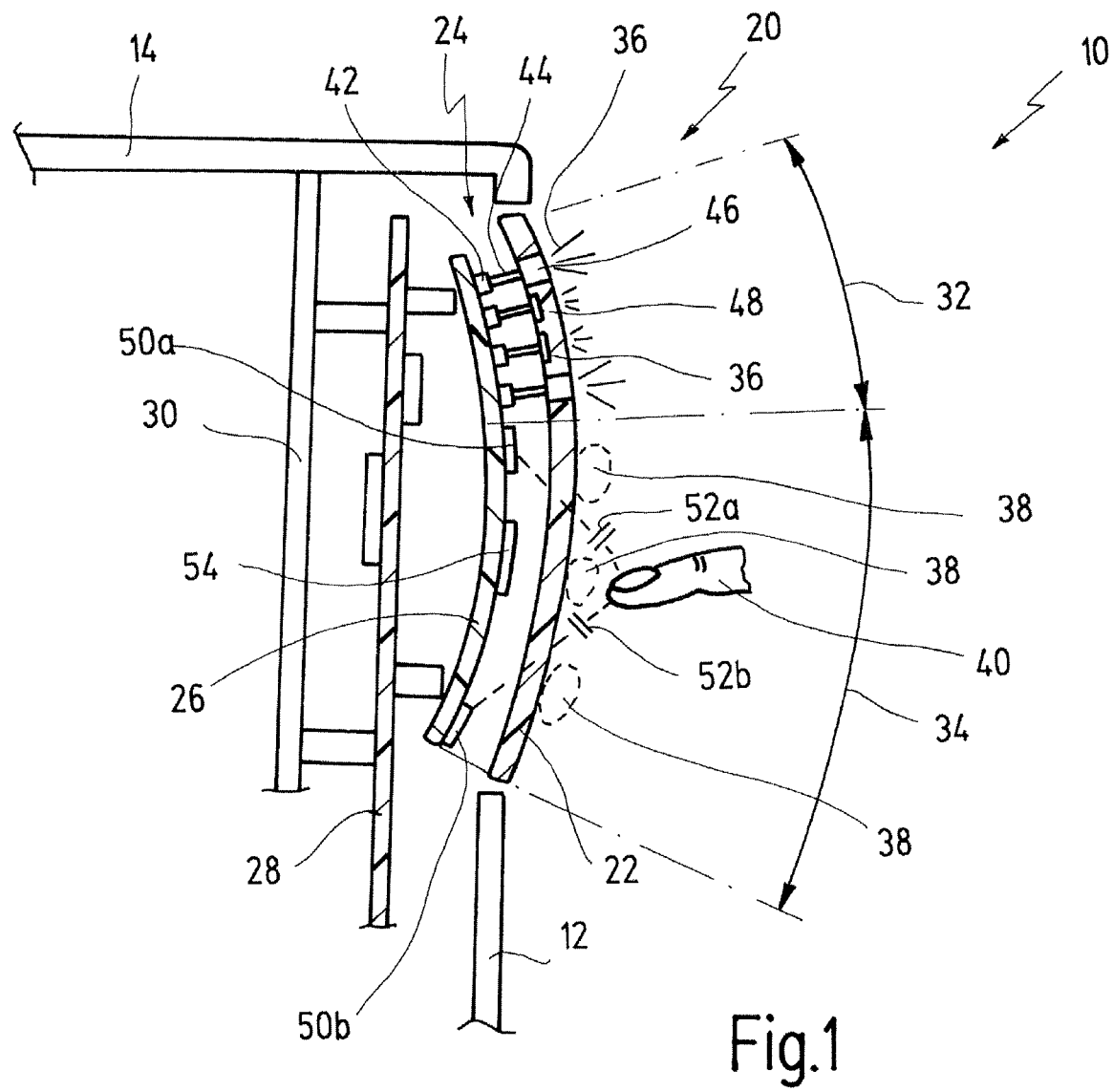
FIG. 1 shows a schematic cross-sectional view through a section of a domestic appliance comprising an operating panel arrangement according to the invention.

In FIG. 1, a domestic appliance, for example in the form of a washing machine or a tumble dryer, as an example of an application, is denoted 10 in general.

The domestic appliance 10 has, in manner which is known per se, a front plate 12 and a cover 14.

An operating panel arrangement 20, on which the essential elements for operating and monitoring the domestic appliance are combined, is provided between the front plate 12 and the cover 14.

The operating panel arrangement 20 has an operating panel 22 in the form of an injection-molded part. The operating panel 22 has, for optical reasons, a shape which is slightly bent in cross section and extends between a section of the front plate 12 and the cover 14. It goes without saying that suitable measures for sealing off (protection against water or splashing) are provided between the operating panel 22 and the front plate 12 or the cover 14. However, these means are not shown for reasons of clarity of the illustration.

The operating panel arrangement 20 also has an electrical circuit arrangement 24 which contains hardware for processing actuation instructions and for acknowledging and otherwise displaying appliance states.

The electrical circuit arrangement 24 is realized substantially on a first printed circuit 26. The first printed circuit may comprise a rigid material. In the present case, the first printed circuit 26 is manufactured from a flexible material and is oriented approximately parallel to the extent of the operating panel 22 in the region of the inside of said operating panel.

The first printed circuit 26 is mounted within the operating panel 22 relative to it. In general, the first printed circuit 26 is preferably fixed directly on the operating panel 22.

The first printed circuit 26 can contain all the electrics/electronics, for example including the power control system of the domestic appliance including power electronics etc.

However, there are variants which have more than one printed circuit.

FIG. 1 shows such a variant comprising a second printed circuit 28 which, in the illustrated example, contains the actual control system of the domestic appliance including power electronics etc.

The second printed circuit 28 can be mounted on the first printed circuit 26 and therefore also indirectly on the operating panel 22. However, it is also possible to mount the second printed circuit 28 (as shown) on a mount 30 which is connected to the housing (the cover 14 or another housing part of the domestic appliance 10).

The flexible first printed circuit 26 can be mounted on a suitable rigid mount, this not being illustrated in any detail in FIG. 1. However, the first printed circuit 26 can also be mounted directly on the rear of the operating panel 22.

The operating panel arrangement 20 has a display field 32 and an operating field 34. For reasons of clarity of the illustration, these fields 32, 34 are arranged adjacent to one another in FIG. 1. However, they may also be interleaved or identical.

The display field 32 has a plurality of display sections 36 which each serve to display a specific state of the domestic appliance 10 or the like.

In a corresponding manner, the operating field 34 has a plurality of actuating sections 38. In the present case, the actuating sections 38 are illustrated as spatial regions on the operating panel 22 which are roughly delimited.

A finger 40 of an operator person (operating means) is used to operate the actuating sections 38.

If the finger 40 is moved into the region of one of the actuating sections 38, this is identified in a contact-free manner, to be precise by means of a touch-field electronics system which is still to be described in the text which follows.

Since actuation of the actuating section 38 consequently does not involve any mechanical movement of a switch or button element, it is preferred when this actuation is visually and/or audibly acknowledged. One of the respective display sections 36 can be used for visual acknowledgement purposes.

It goes without saying that, in practice, a corresponding display section 36 is spatially directly associated with an operating section 38.

In the present case, a display section 36 can be formed by an LED 42 which is arranged on the front of the first printed circuit 26. The light from the LED 42 can then be conducted via a light guide 44, for example to an aperture 46 in the operating panel 22 (or in an opaque coating). As an alternative, it is possible to conduct the light from an LED 42 via a light guide 44 to a region 48 of relatively low wall thickness.

It goes without saying here that the aperture 46 can be closed by a transparent stopper, for example in the form of a light guide, in order to ensure it is protected from splashing. Production is made easier in the case of a design of the display sections 36 by means of parts of relatively low wall thickness 48.

A plurality of at least three electrodes 50a, 50b is arranged on the first printed circuit 26, to be precise in a plane approximately parallel to the operating panel 22. Only two of the three electrodes are illustrated in FIG. 1. The printed circuit 26 is also fitted with evaluation electronics 54 which form a touch-field electronics system together with the electrodes 50.

The operating principle of this touch-field electronics system involves a field (for example an electrostatic field) which is present between the electrodes 50 and an approaching operating means (finger 40) being detected and measured. This is schematically illustrated in FIG. 1 by capacitors 52a and 52b. The touch-field electronics system measures, as it were, the capacitance between the respective electrodes 50 and the finger 40, with the capacitance being a measure of the distance between the finger 40 and the respective electrode 50.

By using at least three electrodes 50, it is then possible to determine the position of the finger 40 in relation to the three electrodes 50 by means of the so-called triangulation method. Accordingly, the evaluation electronics 54 can also detect the relative position of the finger 40 in relation to the front region of the operating panel 22. When the finger 40 is accordingly moved into one of the actuating sections 38, this can be identified by the touch-field electronics system and be assessed as actuation of this actuating section 38.

From the above, it can be seen that the position of the actuating sections 38 can accordingly be completely freely defined. Any desired location in the region of the front of the operating panel 22 can be defined as an actuating section 38 by suitable programming of the evaluation electronics 54.

Accordingly, a large number of different operating panels 20 with actuating sections 38 in different positions can be defined with the same basic electronics. Correspondingly variable text can then be provided on the operating panel 22 (for example by digital printing as a function of the programming of the evaluation electronics 54).

In this case, the display field 30 can also be designed to be variable. For example, a plurality of possible mounting positions for LEDs in the form of a grid can be provided on the first printed circuit 26. LEDs are then mounted in suitable positions depending on the variants of the domestic appliance realized.

Figure 2:
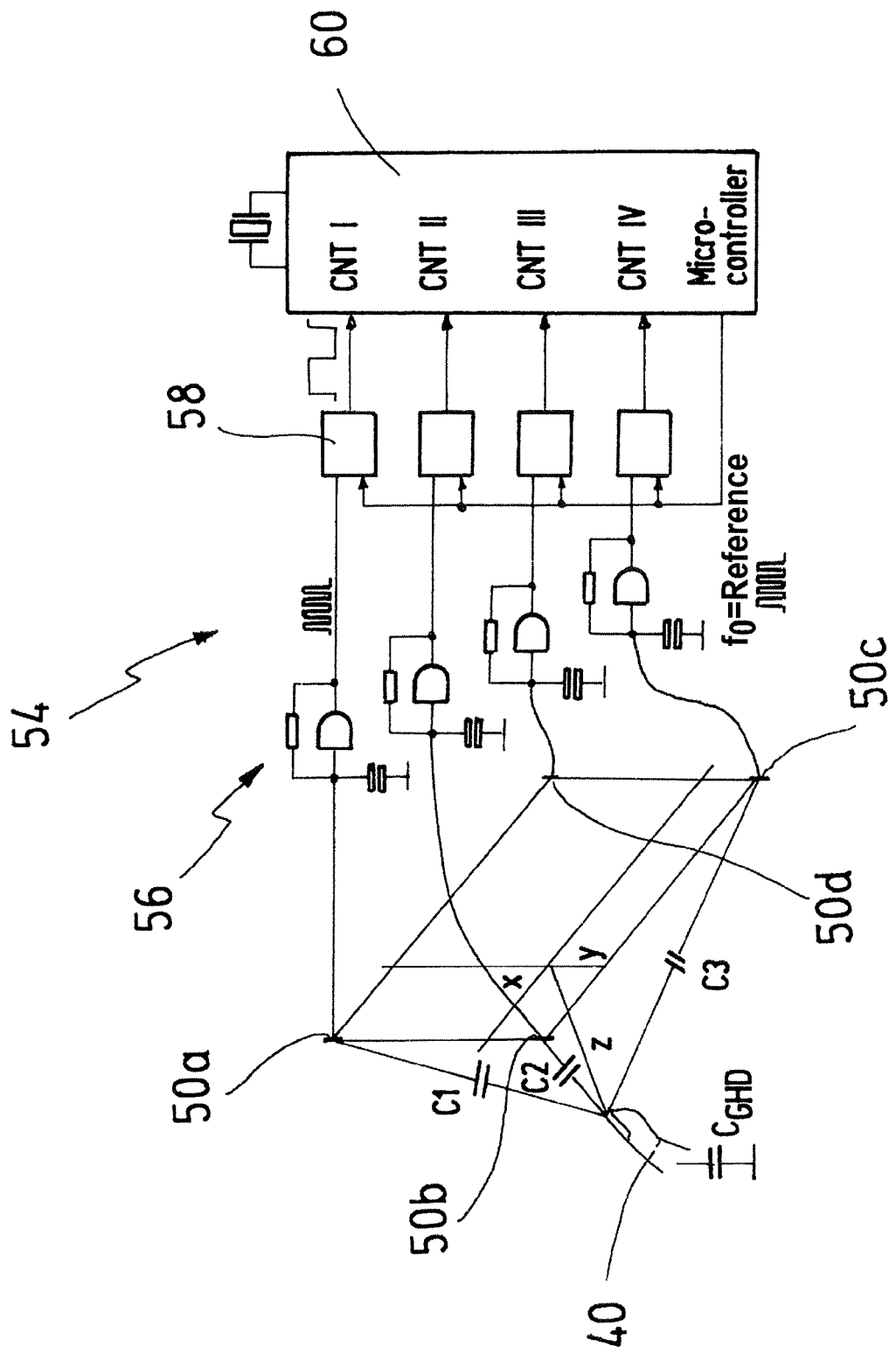
FIG. 2 shows a schematic illustration of a touch-field electronics system comprising evaluation electronics.

FIG. 2 schematically shows the touch-field electronics system with four electrodes 50a-50d. Only three electrodes are generally used to calculate the relative position of the finger 40 in relation to the electrodes, as is also illustrated in FIG. 2.

However, the fourth electrode can be used to improve the accuracy of evaluation.

The electrodes 50 are each connected to a comparator 58 via an oscillator unit 56. Evaluation as to how far a frequency shift has taken place in the region of the oscillator unit 56 takes place in the comparator 58. Such a frequency shift is given by a change in the respective capacitance across the respective electrode 50. This is schematically illustrated by capacitors C1, C2, C3 in FIG. 2.

The outputs of the comparator 58 are connected to a microcontroller 60 which detects, evaluates and converts the frequency shifts into position information. This position information then contains the coordinates of the finger 40 in the x, y and z directions in relation to a point of origin which may lie, for example, in the plane of the electrodes 50 (as is illustrated in FIG. 2).

Figure 3:
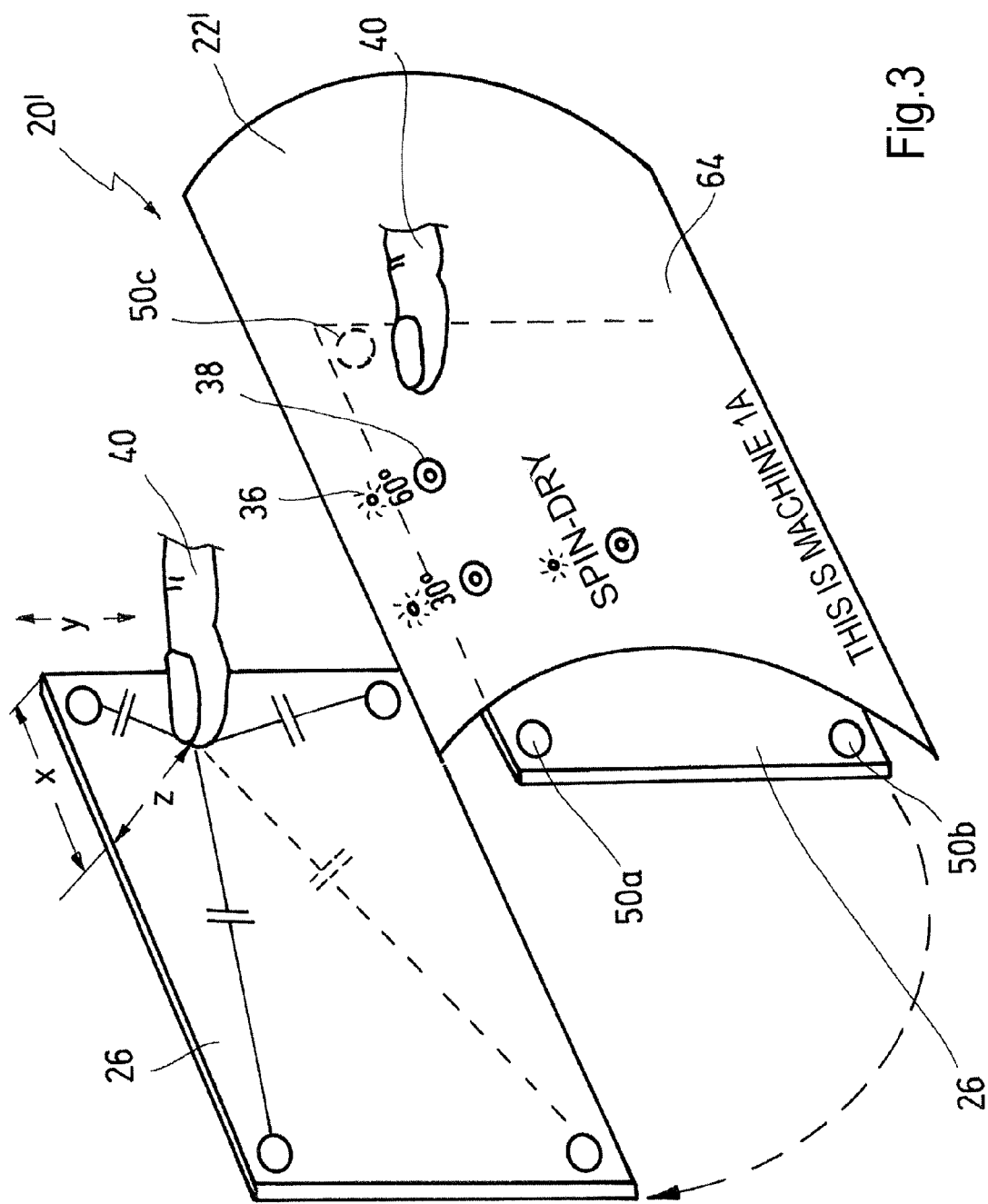
FIG. 3 shows a schematic perspective view of a further embodiment of an operating panel arrangement according to the invention.

FIG. 3 shows an alternative embodiment of an operating panel arrangement 20' according to the invention.

The operating panel arrangement 20' corresponds to the operating panel arrangement 20 of FIG. 1 in terms of structure and manner of operation. Only the differences are discussed in the text which follows.

Therefore, it can be seen that the actuating sections 38 are each illustrated by a corresponding printing. Accordingly, text is in each case associated with the display sections 36 in order to illustrate what is to be displayed by the respective display section 36.

FIG. 3 also illustrates that an individual printing 64 can be provided on the operating panel 22', for example in accordance with the customer's wishes. Since the operating panel 22' is printed first at the end of the value added chain, such individualization is comparatively easy to realize.

Figure 4:
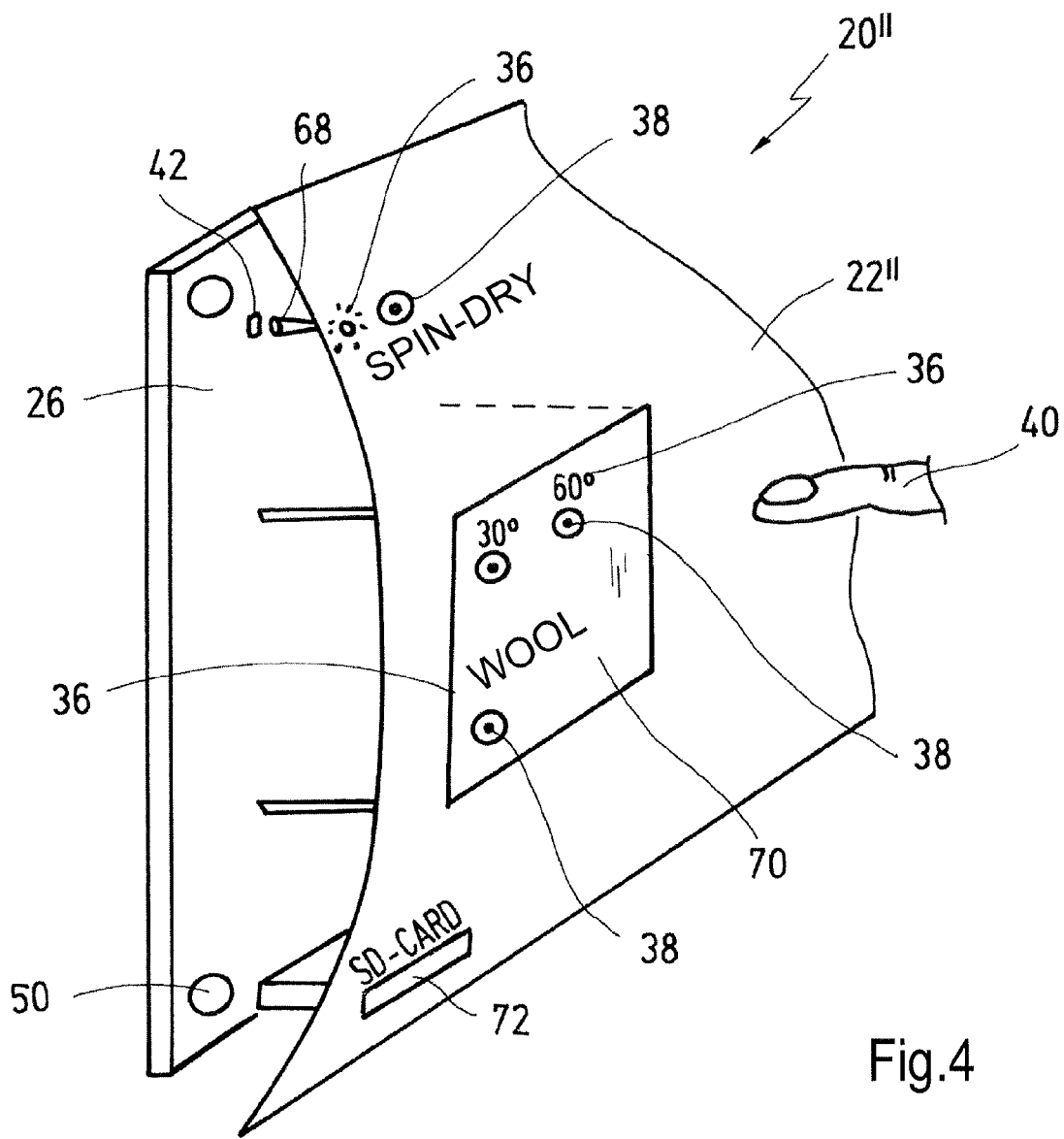
FIG. 4 shows a schematic perspective view of a further embodiment of an operating panel arrangement according to the invention.

FIG. 4 shows a further embodiment of an operating panel arrangement 20" according to the invention. This generally corresponds to the operating panel arrangement 20 of FIG. 1 in terms of structure and manner of operation. Only the differences are discussed in the text which follows.

It can firstly be seen that an LED 42 can have an associated lens 68 with which the LED light can be focused onto the rear of the operating panel 22" in order to thus define a precisely delimited display section 36.

FIG. 4 also shows that the display field 32 contains, in addition to some LED display sections 36, a monitor in the form of an LCD display 70.

The monitor 70 constitutes display sections 36, to be precise by means of suitable programming. It is also possible to program the touch-field electronics system such that actuating sections 38 are arranged on the front of the monitor 70. Accordingly, the monitor 70 can be operated like a touch panel even though actuation is not performed by means of the monitor 70 but indirectly by means of the touch-field arrangement comprising the electrodes 50 and the evaluation electronics 54.

FIG. 4 also shows an interface for data interchange (for example as a card reader in the form of an SD card) 72. In this way, it is possible to change the programming, for example by inserting different SD cards. By way of example, a basic machine can be upgraded by an additionally purchased SD card in such a way that additional functions, for example wash programs, are provided. Other types of interfaces include a USB interface, an interface for a CF card, an RS232 interface etc.

Figure 5:
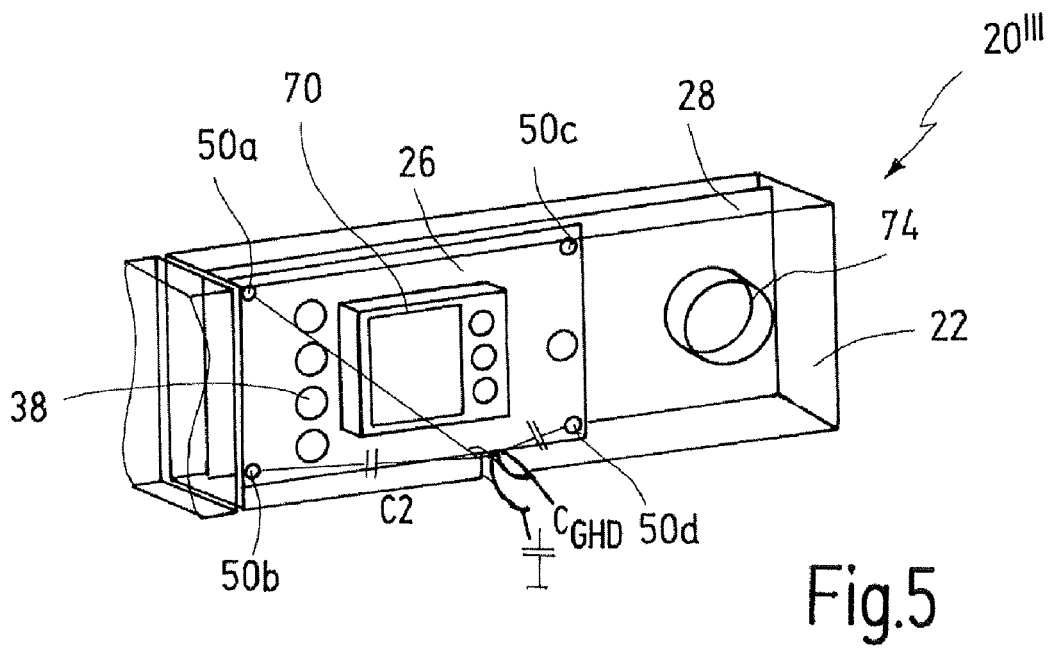
FIG. 5 shows a schematic perspective view of a further embodiment of an operating panel arrangement according to the invention.

FIG. 5 shows a further embodiment of an operating panel arrangement 20''' according to the invention. This corresponds to the operating panel arrangement 20 of FIG. 1 in terms of function and structure. Only the differences are discussed in the text which follows.

It can firstly be seen that a rotary mains switch 74 is provided on the second printed circuit 28. This switch also serves to actuate the domestic appliance, but contains a mechanical switch by means of which it can be disconnected from the mains.

However, as an alternative, it is also possible to electronically realize on and off switches of a domestic appliance by the touch-field electronics system being used, for example, as a proximity sensor.

Figure 6:
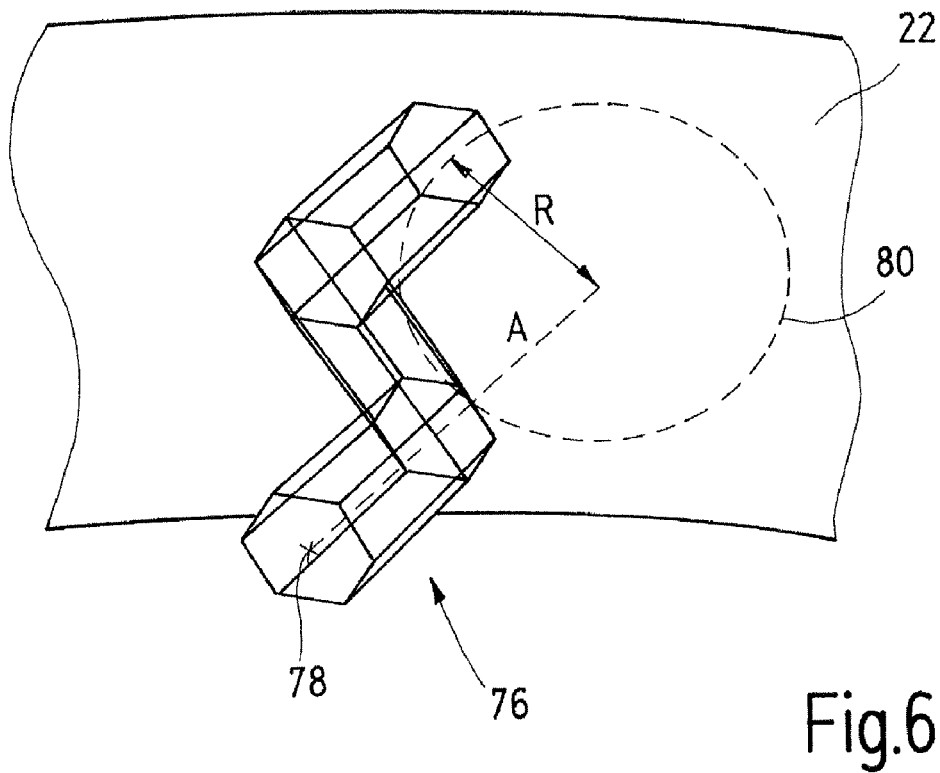
FIG. 6 shows a schematic illustration of an angled light guide and the display section positions which can be realized with it.

FIG. 6 shows an angled (cranked) light guide 76 which can consequently be used to increase the variability for manufacture of the operating panel arrangement according to the invention. The angled light guide 76 can be associated at one end with an LED position 78. By rotating the light guide 76 about an axis concentrically to the LED position 78, different display sections 36 can be realized at the other end. A circle of possible display sections is schematically denoted 80 in FIG. 6.

On account of this embodiment, it is possible to realize a plurality of different display sections 36 with only a few fixed LED positions on the first printed circuit 26, in order to thus permit variants to be formed.

The light guide 76 has a hexagonal cross section in the illustrated example. The honeycomb form can be used to represent a total of six different display sections 36 in relation to the axis A. Furthermore, light guides 76 of this type can be arranged adjacent to one another, with the side faces touching. As a result, greater stability of such a light guide arrangement comprising a plurality of light guides 76 can be achieved overall.

Figure 7:
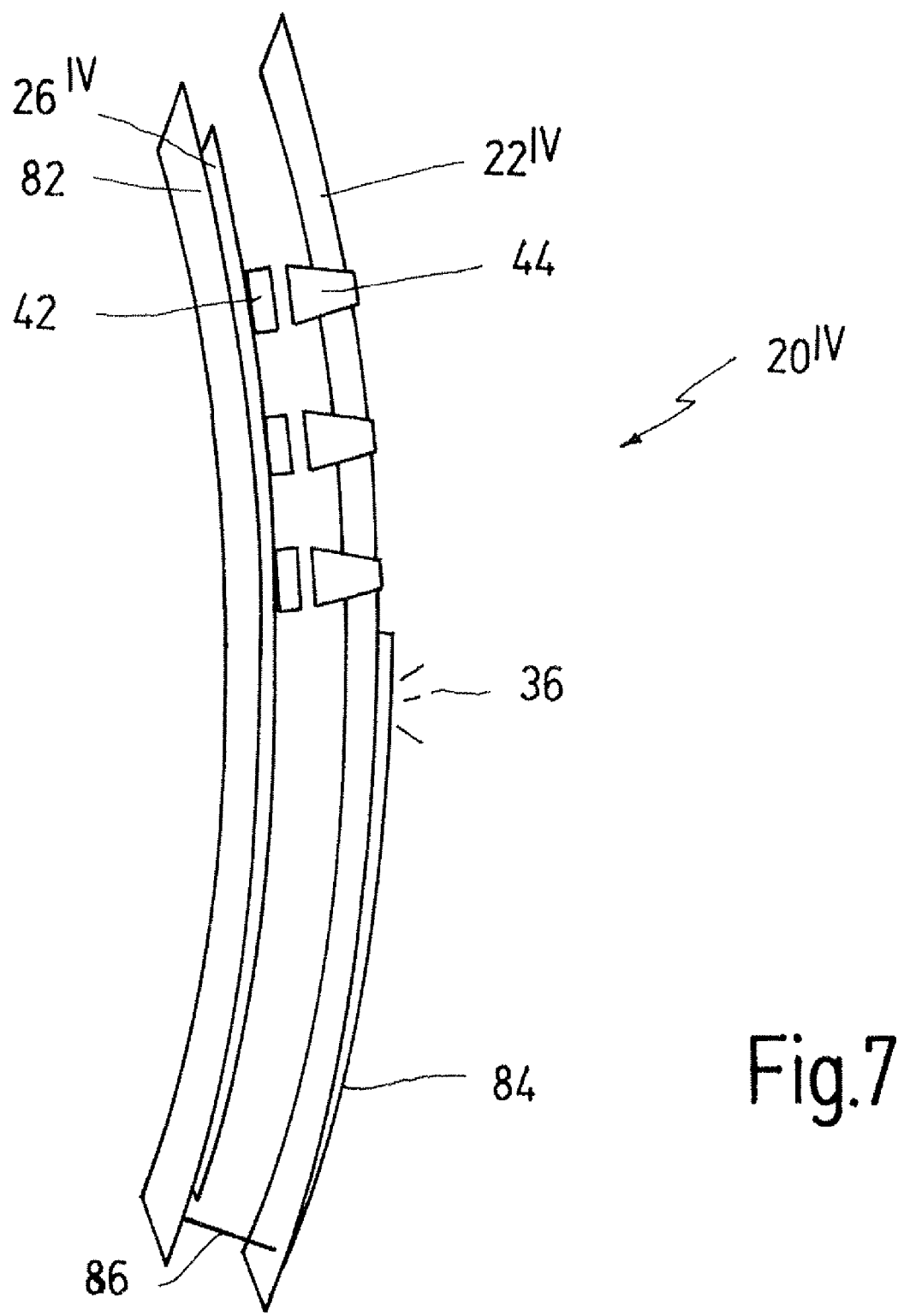
FIG. 7 shows a schematic perspective view of a further embodiment of an operating panel arrangement according to the invention.

FIG. 7 shows a further embodiment of an operating panel arrangement 20$^{IV}$ according to the invention. This corresponds to the operating panel arrangement 20 of FIG. 1 in terms of structure and manner of operation. Only the differences are discussed in the text which follows.

It can firstly be seen that the flexible printed circuit 26$^{IV}$ is mounted on a fixed, bent printed circuit mount 82. This printed circuit mount is arranged on the rear of the first printed circuit 26$^{IV}$.

It can also be seen that a film-type monitor 84 in the form of an OLED monitor is arranged on the front of the operating panel 22$^{IV}$. This film-type monitor is connected to the printed circuit 26$^{IV}$ by means of schematically indicated connection cables 86 and serves to realize at least one display section 36.

In general, the following is also to be noted with reference to the design of the touch-field electronics system. This applies to all the abovementioned embodiments.

The electrode structures comprising the individual points 50 or individual conductor tracks which form an X-Y grid are preferably fitted directly on or very close to the inside of the operating panel 22. This can be done by laminating a film on, by printing with electrically conductive materials or by so-called MID construction (MID=Mold Integrated Device).

Such MIDs are molded parts with an integrated conductive pattern and can be manufactured in a very wide variety of ways, for example by single-component injection molding with subsequent chemical treatment and patterning of conductor tracks by laser and subsequent metallization, by two-component injection molding and subsequent metallization or by insert molding.

Printing can be performed as above using conventional printing methods, but preferably also using digital printing methods.

In the case of lamination of films, a patterned film can be adhesively bonded to the inside of the operating panel over the entire surface area. However, it is also possible for only individual sections of the inside to be provided with pieces of film.

Contact can be made between the operating panel as the circuit mount and a separately provided printed circuit for control by means of contact springs, solder connections or electrical adhesive connections.

A further option is the use of rigid/flexible printed circuits, in which rigid printed circuit regions are connected by flexible printed circuit regions. In this case, a rigid printed circuit region could, for example, be fitted on the inside of the operating panel and be connected to a further rigid printed circuit region (for control purposes) by means of a flexible printed circuit region.

Figure 8:
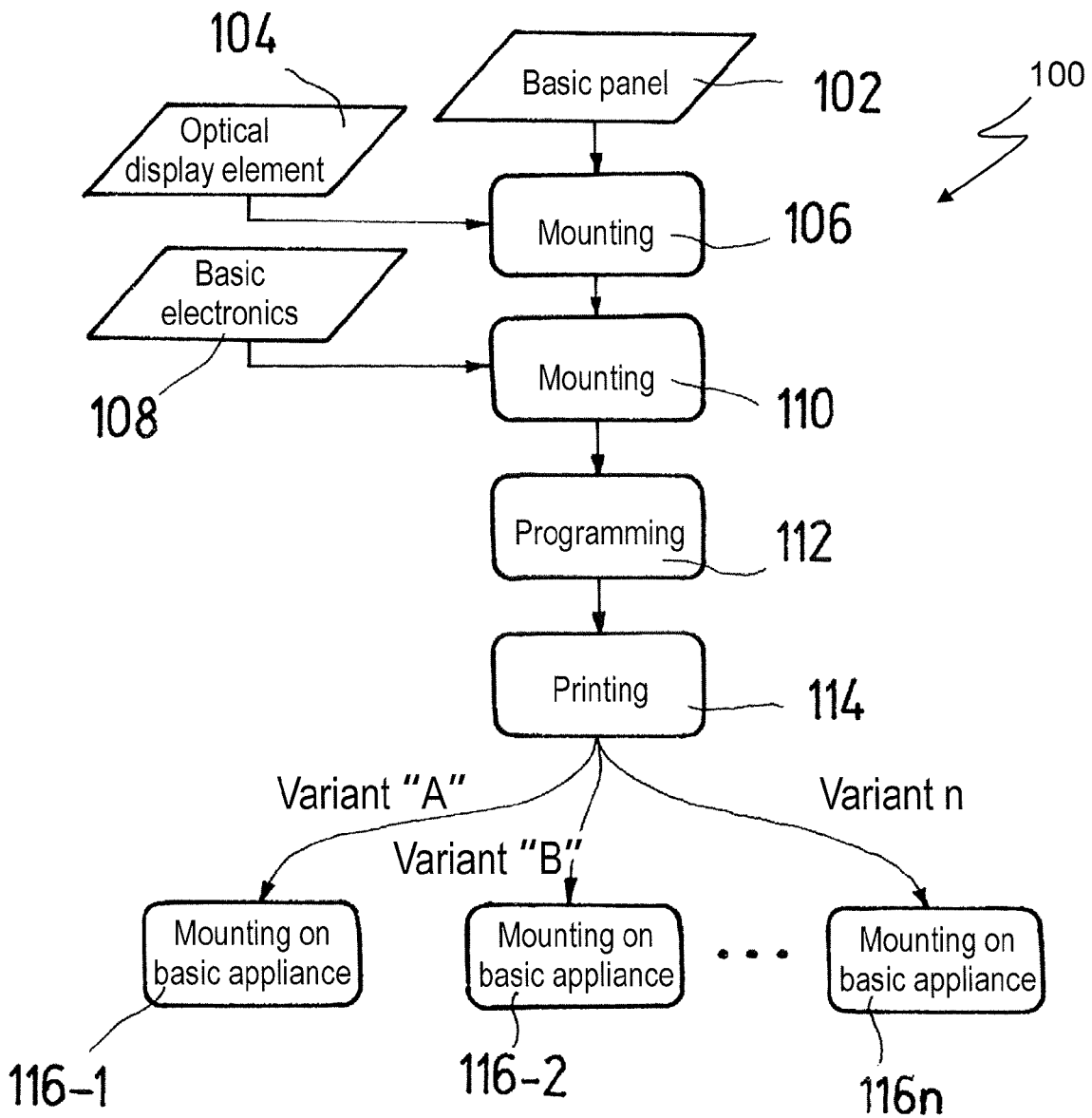
FIG. 8 shows a schematic illustration of a method according to the invention for manufacturing an operating panel arrangement in the form of a flowchart.

FIG. 8 schematically shows an embodiment of the method according to the invention for manufacturing an operating panel arrangement in the form of a flowchart.

The method is denoted 100 in general in FIG. 8 and contains a step 102 for manufacturing an operating panel 22 (basic panel) and providing for the manufacture of the operating panel arrangement 20.

In a corresponding manner, optical display elements, for example in the form of LEDs, in the form of film-type monitors and/or in the form of an LCD monitor, are provided (step 104). These optical display elements are mounted on the operating panel 22 in step 106. The basic electronics, that is to say the electrical circuit arrangement 24 with the printed circuit 26, are provided in a further step 108. The operating panel 22 is mounted on the electrical circuit arrangement 24 in step 110 (assembly of operating panel 22 and printed circuit 26).

The electrical circuit arrangement 24 is programmed in step 112. In particular, the evaluation electronics 54 contained in said circuit arrangement are programmed, so that specific regions in front of the operating panel 22 are defined as actuating sections 38. Furthermore, programming is performed as a function of the mounting of LEDs, if these LEDs form display sections 36. The monitor 70; 84 is also programmed if such a monitor is provided.

Then, further printing is performed in step 114, to be precise particularly when the display sections are not already realized by the monitor 70; 84 and/or LEDs. In general, however, printing is performed in step 114 for esthetic reasons too. Furthermore, individualization is possible, to be precise in accordance with customer's wishes, for example depending on an online order.

The operating panel arrangement prefabricated in this way is then mounted on the basic appliance of the application, in order to form different variants.

It can be seen that different variants "A", "B" to "n" can be realized. In this case, these variants can be manufactured in immediate succession on a production line (assembly line).

Even though an exemplary embodiment of an operating panel arrangement according to the invention and an exemplary embodiment of a manufacturing method according to the invention for an operating panel arrangement have been substantially described on the basis of an application in the form of a domestic appliance, it goes without saying that the invention can also be used for other applications, as already mentioned.

What is claimed is:

1. An operating panel arrangement comprising an operating panel which has formed on its outside actuating sections and display sections for operating or monitoring purposes, and comprising an electrical circuit arrangement which is coupled to the actuating sections and the display sections and is arranged in the region of the inside of the operating panel,
wherein the circuit arrangement has at least three electrodes, which are arranged in a manner distributed approximately parallel to the operating panel, and an evaluation section which is designed to calculate the spatial position of an operator in relation to the position of the three electrodes, to be precise by evaluating the fields between the electrodes and the operator, so that the actuating sections can be freely defined as positions of the operator in the region of the outside of the operating panel.

2. The operating panel arrangement as claimed in claim 1, wherein the operator means is a finger.

3. The operating panel arrangement as claimed in claim 1, wherein the electrodes are arranged in the region of corners of an operating field of the operating panel within which the actuating sections are arranged.

4. The operating panel arrangement as claimed in claim 1, wherein at least one actuating section is shown on the outside of the operating panel by being printed on.

5. The operating panel arrangement as claimed in claim 1, wherein at least one actuating section is shown on the outside of the operating panel by a display on a monitor.

6. The operating panel arrangement as claimed in claim 5, wherein the monitor is a film-type monitor.

7. The operating panel arrangement as claimed in claim 5, wherein the monitor is an OLED monitor.

8. The operating panel arrangement as claimed in claim 1, wherein at least one display section has an LED which is arranged on a printed circuit in the region of the inside of the operating panel.

9. The operating panel arrangement as claimed in claim 8, wherein the printed circuit is manufactured from a flexible material and is arranged approximately parallel to the operating panel, at least in the region of a display field in which the display sections are arranged.

10. The operating panel arrangement as claimed in claim 8, wherein the operating panel has an aperture, through which light from the LED shines, in the region of at least one display section.

11. The operating panel arrangement as claimed in claim 8, wherein the operating panel has a wall section, which is of relatively low wall thickness and through which light from the LED shines, in the region of at least one display section.

12. The operating panel arrangement as claimed in claim 8, wherein a display field has a grid coordinate system with a plurality of fixed positions, of which at least some are fitted with LEDs.

13. The operating panel arrangement as claimed in claim 8, wherein the LEDs are coupled to the operating panel via light guides in each case.

14. The operating panel arrangement as claimed in claim 13, wherein at least one light guide is angled and is connected to an LED in such a way that the LED can illuminate different display sections depending on the rotation position of the light guide.

15. The operating panel arrangement as claimed in claim 1, wherein the circuit arrangement has a proximity sensor which identifies the approach of the operating means and activates specific circuit sections as the operating means approaches.

16. The operating panel arrangement as claimed in claim 1, wherein a data interface by means of which the electrical circuit arrangement can be initially programmed or reprogrammed is provided on the operating panel.

17. The operating panel arrangement as claimed in claim 1, wherein the electrical circuit arrangement is designed for the purpose of being able to initially define or redefine actuating sections, in particular keys and key functions, by making an input on the operating field.

18. A method for manufacturing an operating panel arrangement which is constructed in different variants, comprising the steps of:
a) shaping an operating panel;
b) assembling the operating panel and a circuit arrangement;
c) programming the circuit arrangement as a function of the variant for which the operating panel arrangement is manufactured; and
d) printing the operating panel as a function of the variant for which the operating panel arrangement is manufactured,
with step c) and/or step d) taking place after step b).

19. The method as claimed in claim 16, with the operating panel being printed using a digital printing method.

* * * * *